(12) United States Patent
Mun (10) Patent No.: US 7,770,066 B2
(45) Date of Patent: Aug. 3, 2010

(54) METHOD AND SYSTEM FOR CONVERTING USB

(75) Inventor: Kui-Yon Mun, Suwon-si (KR)

(73) Assignee: Samsung Electronics Co., Ltd., Suwon-si, Gyeonggi (KR)

( * ) Notice: Subject to any disclaimer, the term of this patent is extended or adjusted under 35 U.S.C. 154(b) by 564 days.

(21) Appl. No.: 11/781,656

(22) Filed: Jul. 23, 2007

(65) Prior Publication Data

US 2008/0028114 A1   Jan. 31, 2008

(30) Foreign Application Priority Data

Jul. 27, 2006   (KR) ...................... 10-2006-0070589

(51) Int. Cl.
*G06F 11/00* (2006.01)
(52) U.S. Cl. .............................. 714/28; 714/32; 714/44; 714/45; 703/21
(58) Field of Classification Search .................. None
See application file for complete search history.

(56) References Cited

U.S. PATENT DOCUMENTS

| | | | |
|---|---|---|---|
| 6,343,260 B1 * | 1/2002 | Chew | ........................ 702/122 |
| 6,389,560 B1 | 5/2002 | Chew | |
| 6,393,588 B1 * | 5/2002 | Hsu et al. | ...................... 714/43 |
| 6,615,371 B2 * | 9/2003 | McCullough et al. | ......... 714/45 |
| 6,732,301 B1 | 5/2004 | Landry et al. | |
| 6,769,622 B1 * | 8/2004 | Tournemille et al. | ........ 235/492 |
| 6,772,253 B1 | 8/2004 | Slaight et al. | |
| 7,168,029 B2 * | 1/2007 | Lai et al. | ..................... 714/781 |
| 2007/0265822 A1 * | 11/2007 | Mathewson et al. | ........... 703/22 |

FOREIGN PATENT DOCUMENTS

JP   02004280818 A   * 10/2004

OTHER PUBLICATIONS

English Translation of Korean Office Action.
Computer Access Technology Corporation, "CATC USB Chief Bus & Protocol Analyzer User's Manual" for USB Chief Software Version 1.3 Manual Version 1.7, Nov. 9, 2001.

* cited by examiner

*Primary Examiner*—Gabriel L Chu
(74) *Attorney, Agent, or Firm*—F. Chau & Associates, LLC (57) ABSTRACT

A method for testing a USB (universal serial bus) device includes receiving a USB packet trace output from a USB host, at a USB packet trace converting apparatus, generating at least one token corresponding to the USB packet trace received from the USB host, determining a syntax tree corresponding to the at least one token, and generating a code for a USB host model corresponding to the determined syntax tree.

16 Claims, 9 Drawing Sheets

| PATTERN (Regular Expression) | TOKEN |
|---|---|
| TRUE | BOOL |
| FALSE | BOOL |
| ping_on_retry | PRETRY |
| ping_after_nyet | PNYET |
| ACK | ACK |
| PING | PING |
| NYET | NYET |
| empty_frame | EMPTY_FRAME |
| expected_pid | EXPECTED_PID |
| frame | FRAME |
| AUTO | AUTO |
| pid | PID |

| PATTERN (Regular Expression) | TOKEN |
|---|---|
| idle | IDLE |
| TO_EOF | TO_EOF |
| DATA[0-1] | DATA |
| data | sdata |
| \( | LBRACE |
| \) | RBRACE |
| OUT | OUT |
| IN | IN |
| addr | ADDR |
| endp | ENDP |
| = | EQ |
| [0-9A-F]+ | NUM |

(1)  ping    addr=3    endp=2    idle=1    : PACKET TRACE (2)  | PING | ADDR | EQ | NUM | ENDP | EQ | NUM | IDLE | EQ | NUM |

(3)
```
                          out_ping_state
                          usb_pkt.do=(ping);
              ┌──────────────────┼──────────────────┐
         addr_state          endp_state          idle_state
         usb_pkt.addr=atoi($3);  usb_pkt.addr=atoi($3);  usb_pkt.endp=atoi($3);  NO CODE;
   ┌────────┼────────┐    ┌────────┼────────┐    ┌────────┼────────┐
 |ADDR|EQ|NUM|       |ENDP|EQ|NUM|            |IDLE|EQ|NUM|
|PING|
```

(4)  usb_pkt.addr=atoi($3);
     usb_pkt.endp=atoi($3);
     usb_pkt.do(ping);

METHOD AND SYSTEM FOR CONVERTING
USB

CROSS-REFERENCE TO RELATED PATENT APPLICATIONS

This application claims priority under 35 U.S.C. §119 from Korean Patent Application No. 2006-0070589, filed on Jul. 27, 2006, the disclosure of which is hereby incorporated by reference in its entirety.

BACKGROUND OF THE INVENTION

1. Field of the Invention

The present invention relates to a method for testing a USB (universal serial bus) device, and more particularly, to a method and system for testing a USB device by converting a USB packet trace output from a USB host to a host model code.

2. Description of Related Art

To analyze and correct an error generated in a USB SoC (system on chip) device, an RTL (register transfer level) of the USB SoC device is checked by assuming where the error is generated and testing the USB SoC device by generating a FPGA (field programmable gate array) and connecting the FPGA to an actual USB host.

A method using the RTL may check the internal signal and status of the device. However, it is difficult to assume where the error has occurred and reproduce or analyze the cause of the error given an incorrect assumption. Further, the method can reproduce the same error status because the host situation is the same. However, substantially time and effort is needed to correct the error because the internal signal assumed to be relevant is generated as an external output to check the internal status of the device, and the FPGA corresponding to the external output needs to be repeatedly generated.

Thus, there is a demand for a method and apparatus which can reproduce an error of an actual situation and simulate the same internal signal and device status as those in an RTL/NET (netlist: gate level) simulation.

SUMMARY OF THE INVENTION

According to an embodiment of the present invention, a method for testing a USB device comprises receiving a USB packet trace output from a USB host, at a USB packet trace converting apparatus, generating at least one token corresponding to the received USB packet trace received from the USB host, determining a syntax tree corresponding to the at least one token, and generating a host code for a USB host model corresponding to the determined syntax tree.

The receiving of the USB packet trace comprises receiving the USB packet trace output from the USB host, through a USB packet logger and receiving the USB packet trace output from the USB packet logger, at the USB packet trace converting apparatus. The USB packet logger generates a utg (USB traffic generation) file from the USB packet trace and outputs the generated utg file to the USB packet trace converting apparatus.

The USB device test method further comprises storing, in a predetermined storage device, an expression-token table, the expression-token table comprising a stored expression and a stored token corresponding to the expression, and a syntax tree forest generated based on the stored token.

The generating of the at least one token comprises searching the stored expression of the expression-token table stored in the storage device for an expression included in the received USB packet trace and generating the at least one token from the stored token in the expression-token table corresponding to the stored expression based on the expression included in the received USB packet trace.

The determining of the syntax tree comprises searching the syntax tree forest stored in the storage device for a syntax tree comprising the at least one token generated corresponding to the USB packet trace and determining whether the searched syntax tree is the syntax tree corresponding to the at least one token generated corresponding to the USB packet trace. The generating of the host code comprises generating a host code corresponding to the syntax tree while conducting a search from a sub-tree of the determined syntax tree. The code for a USB host model is a USB eVC host code.

According to an embodiment of the present invention, a computer readable medium is provided embodying instructions executable by a processor to perform a method for testing a USB (universal serial bus) device. The method steps comprising receiving a USB packet trace output from a USB host, at a USB packet trace converting apparatus, generating at least one token corresponding to the USB packet trace received from the USB host, determining a syntax tree corresponding to the at least one token, and generating a host code for a USB host model corresponding to the syntax tree.

According to another embodiment of the present invention, a system for testing a USB device comprises a storage device storing an expression-token table, the expression-token table comprising an expression and a token corresponding to the expression, and a syntax tree forest generated based on the token of the expression-token table, a token generation module receiving a USE packet trace output from the USB host and generating at least one generated token corresponding to the received USB packet trace based on the expression-token table, a syntax tree determination module determining a syntax tree corresponding to the at least one generated token based on the syntax tree forest, and a host code generation module generating a host code for a USB host model corresponding to the syntax tree.

The token generation module receives the USB packet trace output from the USB host, through a USB packet logger.

The token generation module searches the expression-token table stored in the storage device for a received expression included in the received USB packet trace and generates the at least one generated token with the token stored in the expression-token table corresponding to the expression based on the received expression. The syntax tree determination module searches the syntax tree forest stored in the storage device for a syntax tree comprising the at least one generated token and determines whether the searched syntax tree is the syntax tree corresponding to the at least one generated token.

The host code generation module generates the host code corresponding to the syntax tree while conducting a search from a sub-tree of the determined syntax tree.

The USB device test system further comprises a host model which receives the host model code output from the host code generation module and outputs a host signal corresponding to the received host model code.

The USB device test system further comprises a USB packet logger which is connected between the USB host and a USB device, receives the USB packet tracer output from the USB host, and outputs the received USB packet trace to the token generation module.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF PREFERRED EMBODIMENTS

Hereinafter, the present invention will be described in detail by explaining preferred embodiments of the invention with reference to the attached drawings. Like reference numerals in the drawings denote like elements.

Figure 1:
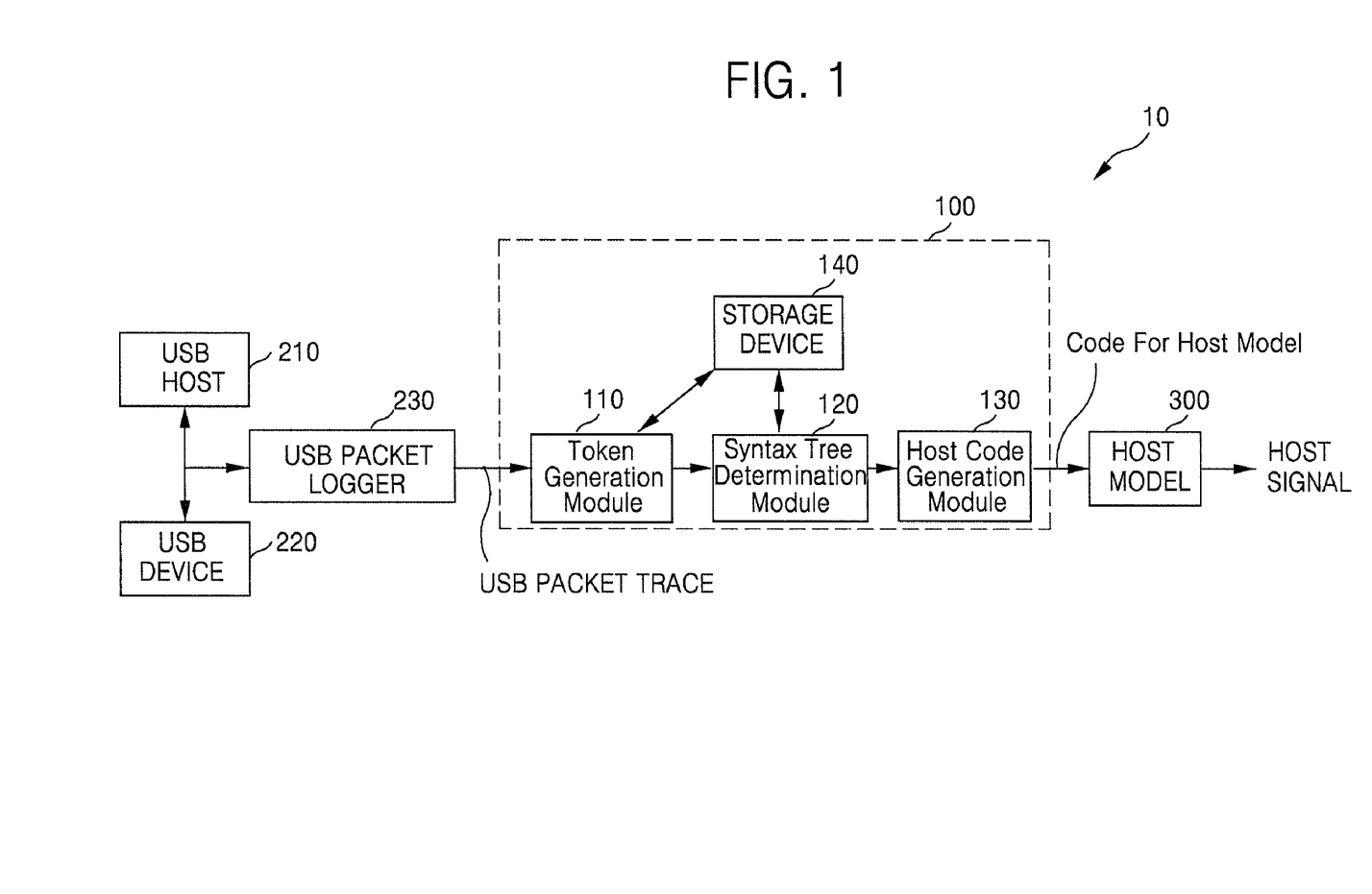
FIG. 1 is a block diagram of a USB device test system having a USB packet trace converting apparatus according to an embodiment of the present invention.

FIG. 1 is a block diagram of a USB device test system having a USB packet trace converting apparatus according to an embodiment of the present invention. Referring to FIG. 1, a USB device test system 10 according to an embodiment of the present invention includes a USB packet trace converting apparatus 100. The USB device test system 10 may further include a USB packet logger 230 and/or a host model 300. The USB packet trace converting apparatus 100 includes a storage device 140, a token generation module 110, a syntax tree determination module 120, and a host code generation module 130.

The storage device 140 stores an expression-token table, the expression-token table comprising an expression that can be included in a USB packet trace and a token corresponding to the expression, and a syntax tree forest generated based on at least one token corresponding to the expression that can be included in the USB packet trace.

The expression-token table and the syntax tree forest may be stored in the storage device 140 in advance. The USB packet trace signifies a sequence of packets that a USB host 210, for example, a computer, outputs to a USB device 220.

Figure 2:
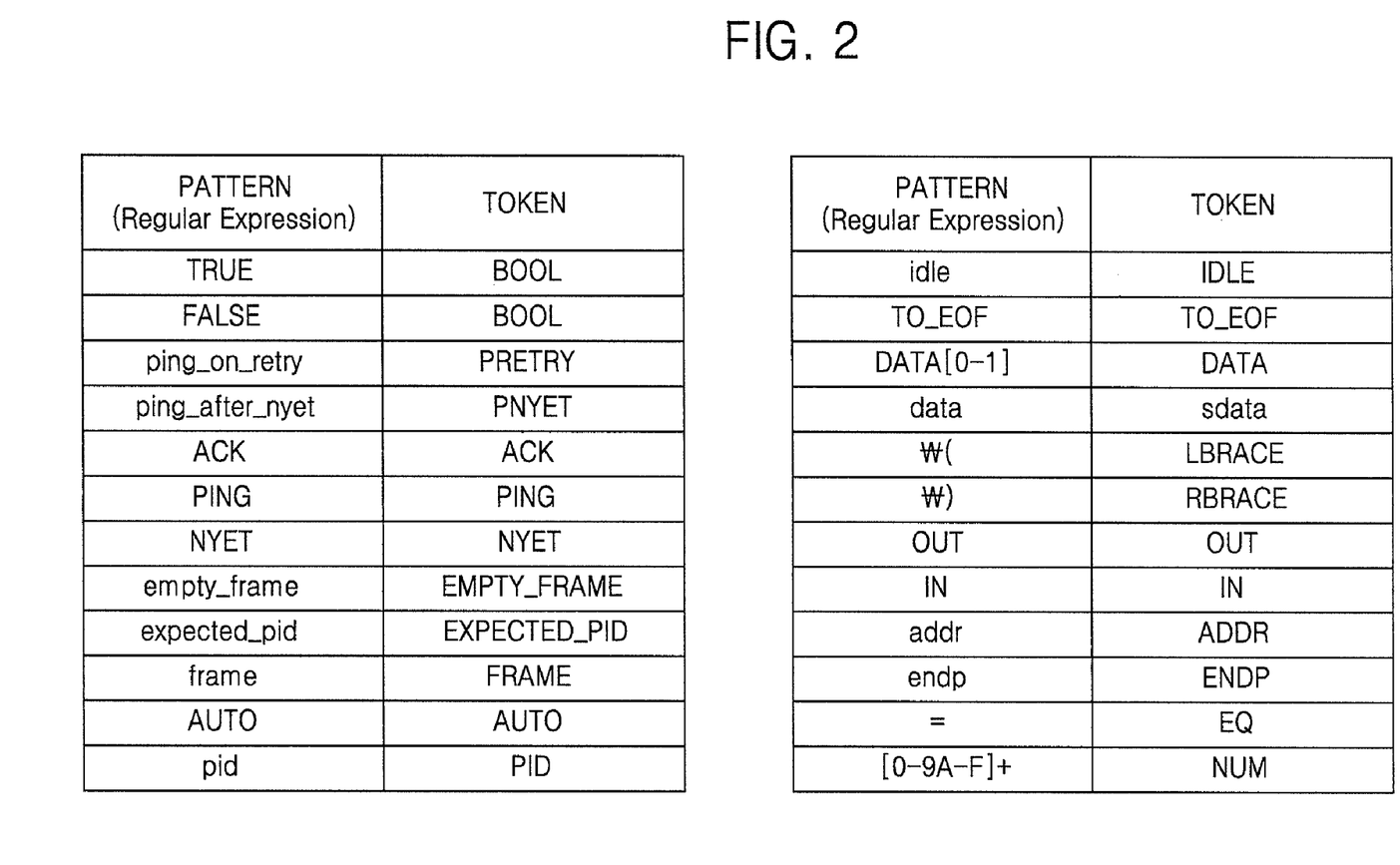
FIG. 2 is an expression-token table according to an embodiment of the present invention.

FIG. 2 is an expression-token table according to an exemplary embodiment of the present invention. Referring to FIGS. 1 and 2, the storage device 140 stores the expression-token table. The expression-token table contains a regular expression that may include all expressions that can be included in the packet trace transmitted by the USB host 210 to the USB device 220 and the token corresponding to the regular expression. For example, when the USB packet trace is "ping addr=3 endp=2 idle=1", the expression-token table contains the regular expressions of "PING", "addr", "=", "[0-9A-F]+", "endp", and "idle" that can include the respective expressions of "ping", "addr", "=", "3", "endp", "=", "2", "idle", "=" and "1". Also, the expression-token table contains tokens of "PING", "ADDR", "EQ", "NUM", "ENDP", and "IDLE" corresponding to the regular expressions of "PING", "addr", "=", "[0-9A-F]+", "endp", and "idle".

Figure 3A:
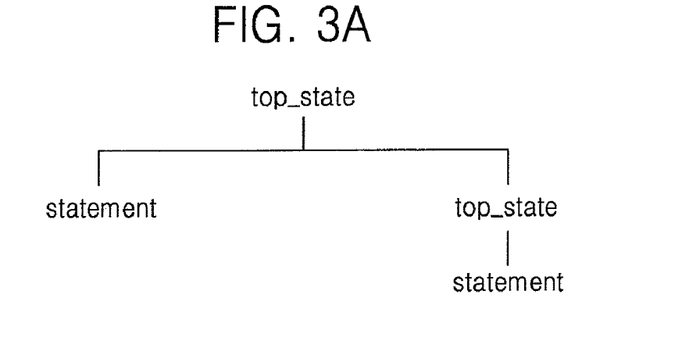
FIGS. 3A through 3S are views showing a syntax tree forest according to an embodiment of the present invention.
Figure 3B:
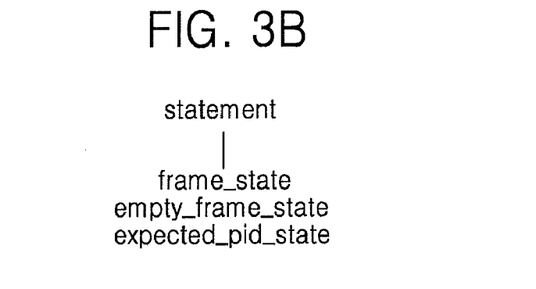
Figure 3C:
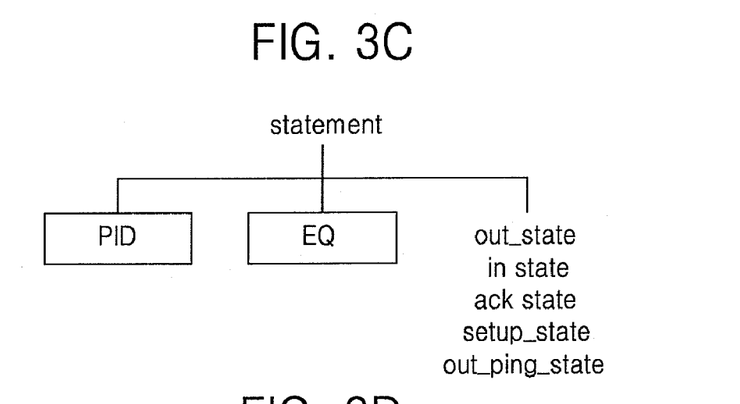
Figure 3D:
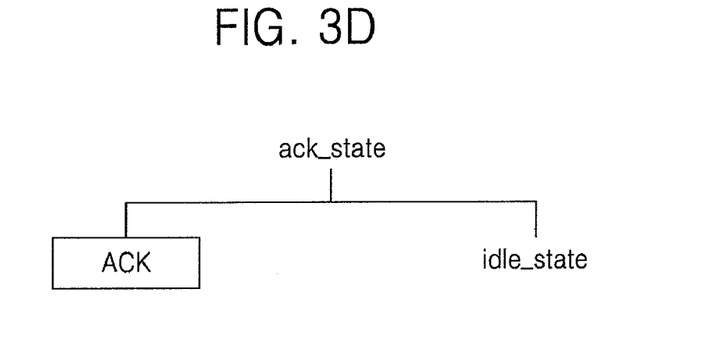
Figure 3E:
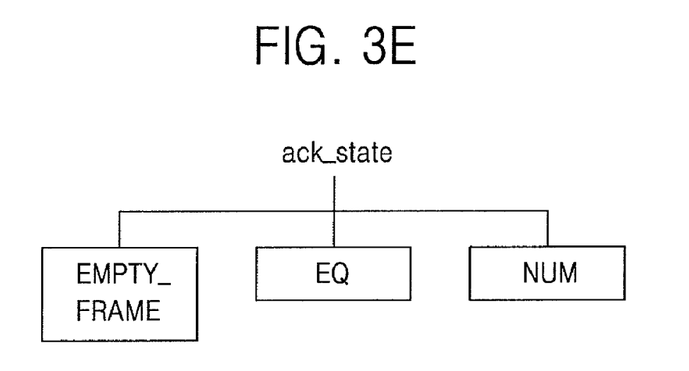
Figure 3F:
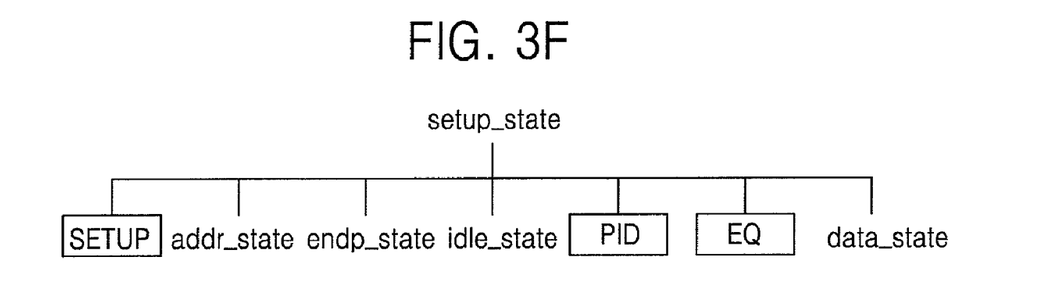
Figure 3G:
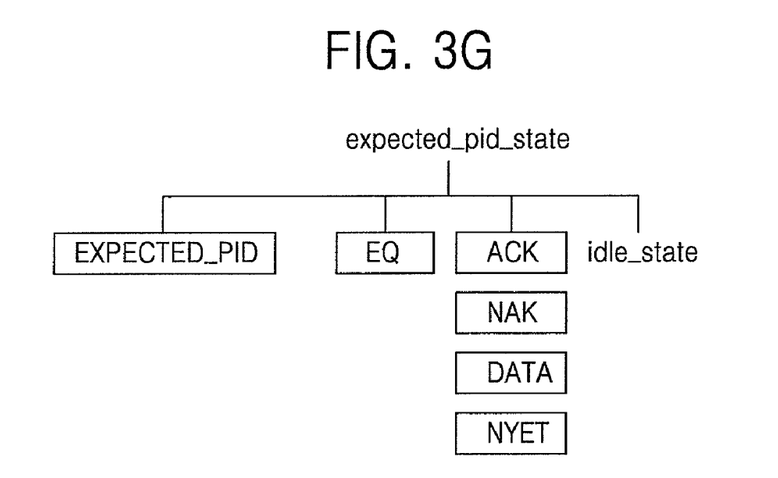
Figure 3H:
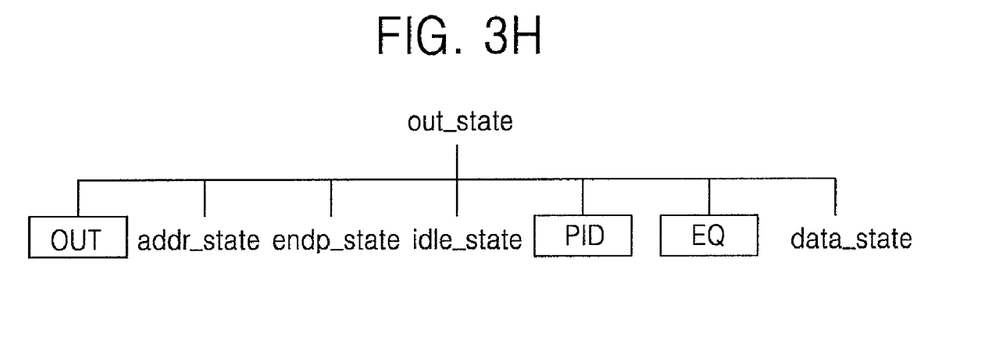
Figure 3I:
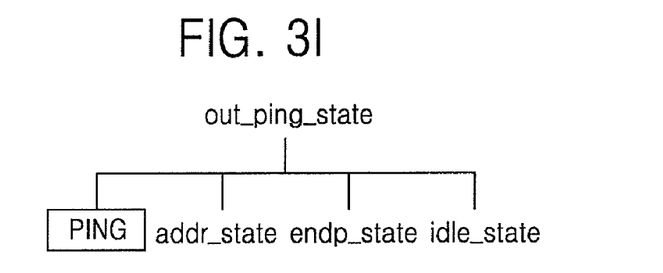
Figure 3J:
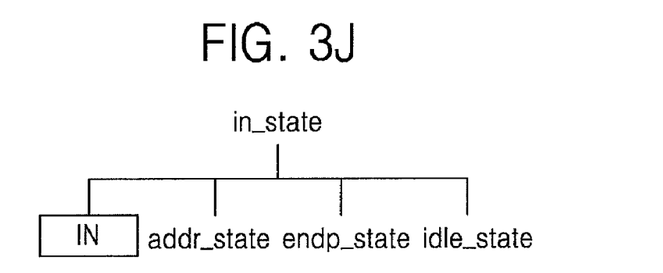
Figure 3K:
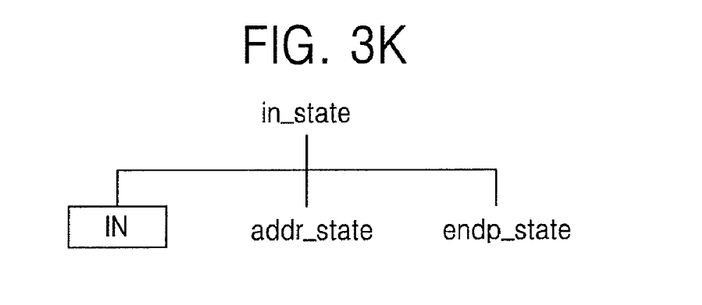
Figure 3L:
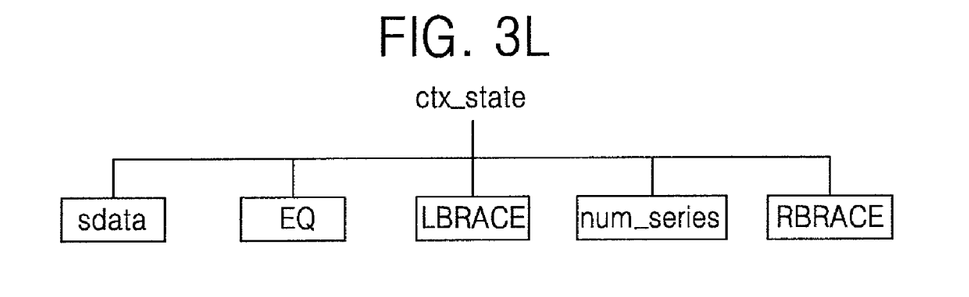
Figure 3M:
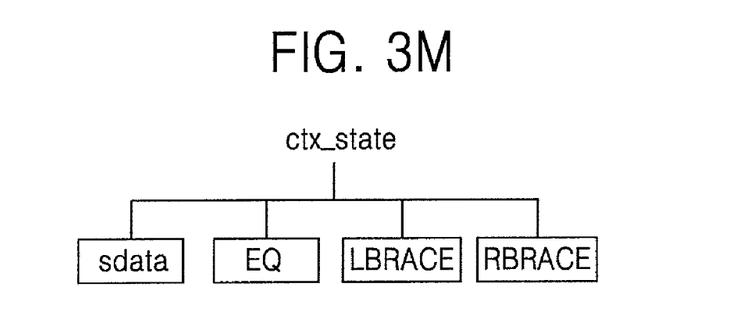
Figure 3N:
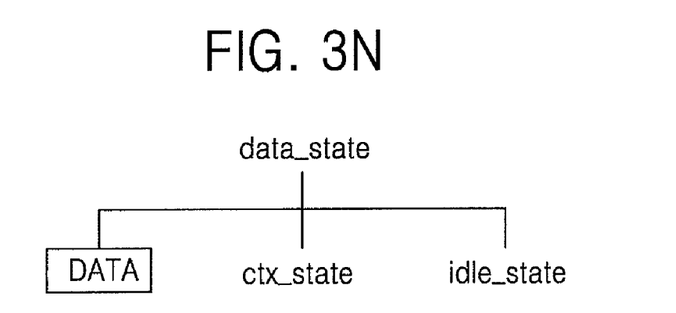
Figure 3O:
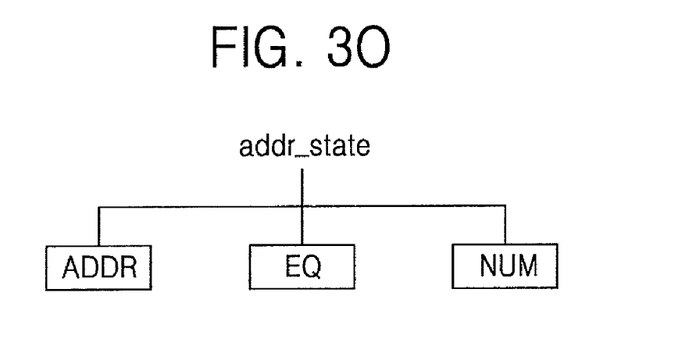
Figure 3P:
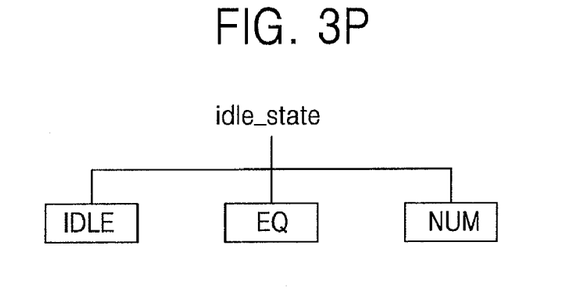
Figure 3Q:
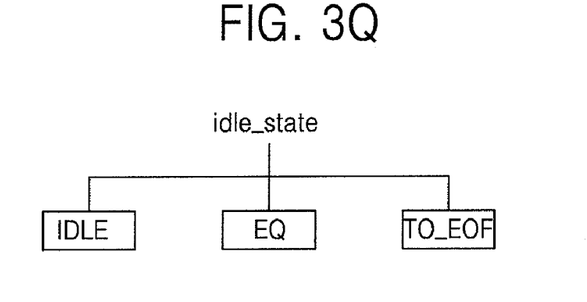
Figure 3R:
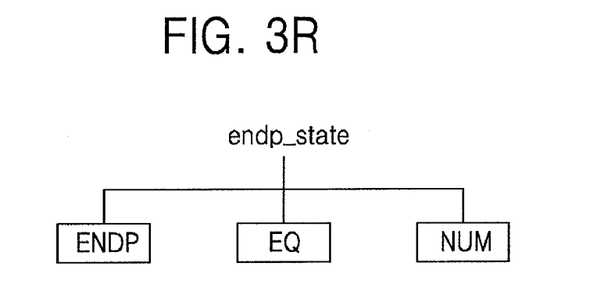
Figure 3S:
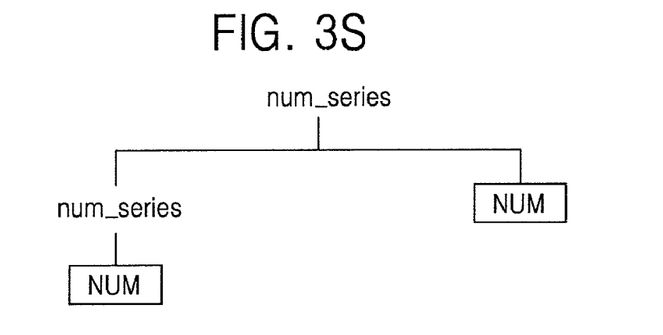

FIGS. 3A through 3S are views showing a syntax tree forest according to an embodiment of the present invention. Referring to FIGS. 1 and 3A through 3S, the storage device 140 stores the syntax tree forest that signifies a set of syntax trees corresponding to the syntax of the USB packet trace. The packets included in the USB packet trace can be expressed by each of the syntax trees shown in FIGS. 3A through 3S or a combination of the syntax trees. For example, the syntax tree shown in FIG. 3I signifies the syntax of a packet trace to output a command of "ping" from the USE host 210. The syntax tree of FIG. 3I shows that a token of "PING", a statement indicating an address (addr_state) a statement indicating an end-point (endp_state), and a statement indicating an idle state (idle_state) are needed to output the "ping" command.

Figure 5:
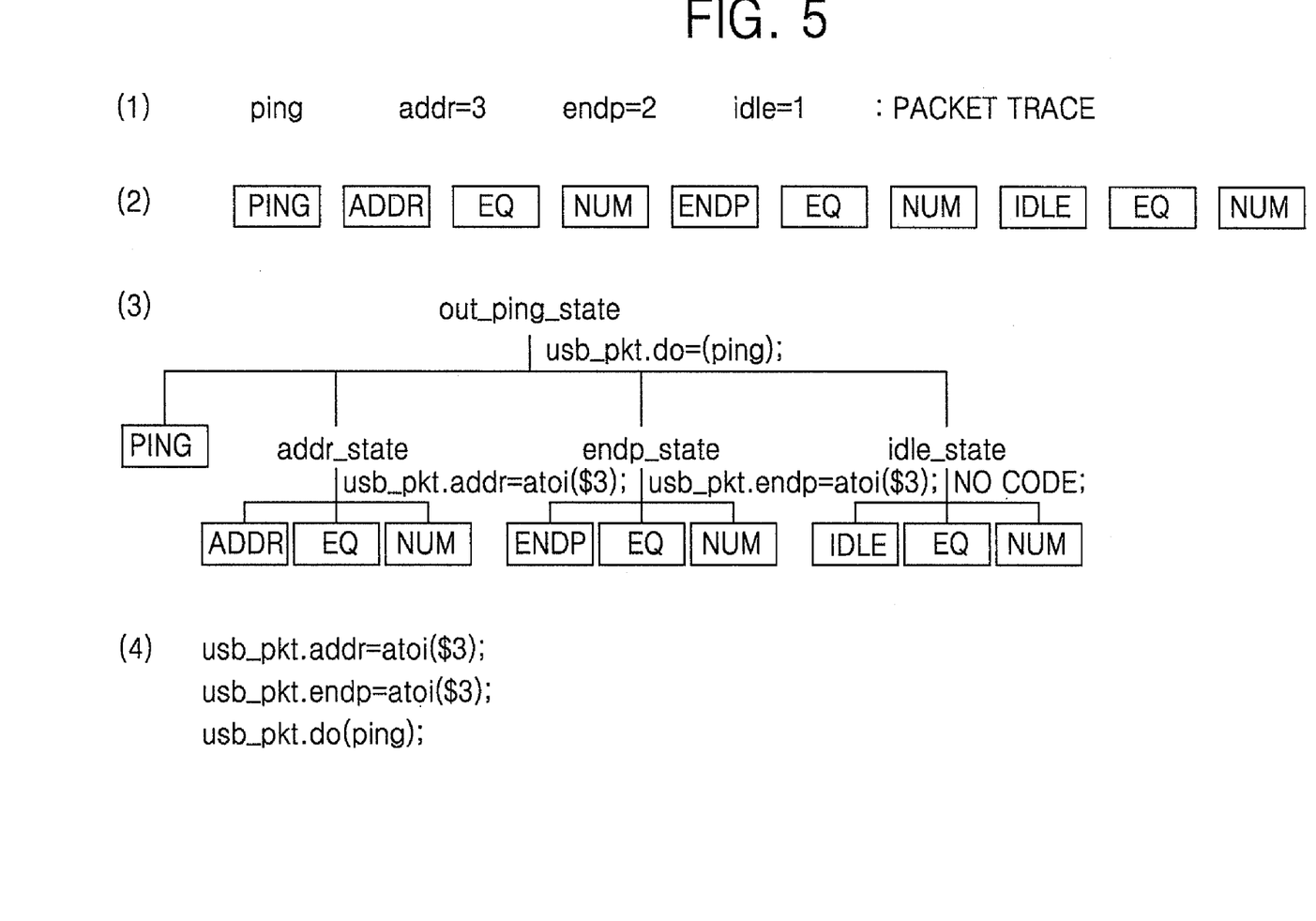
FIG. 5 is a view showing the conversion process of a USB packet trace according to an embodiment of the present invention.

When an overall syntax tree is generated by a combination of the syntax trees shown in FIGS. 3A through 3S, terminal nodes of the overall syntax tree, for example, (3) of FIG. 5, are configured with a token including a combination of the tokens corresponding to the received USB packet traces. The terminal node in a box among the terminal nodes of the syntax tree forest, for example, PID or EQ of FIG. 3C, signifies the token contained in the expression-token table. Each of the syntax trees can be realized as an array, a linked-list, a doubly linked-list, B+ tree, etc. The scope of the syntax trees is not limited thereto.

In a process of converting the USB packet trace according to an exemplary embodiment of the present invention, the USB device 220 is tested by assuming a logic error of the USB device 220 or an error of firmware that drives the USB device 220. Since it is assumed that there is no syntax error of the USB packet trace output from the USB host 210, the sentences included in the USB packet trace conform to the syntax expressed by the syntax tree forest. Thus, the USB packet trace is converted to a code that can be used in the RTL/NET simulation by using the expression-token table and the syntax tree forest.

Figure 4:
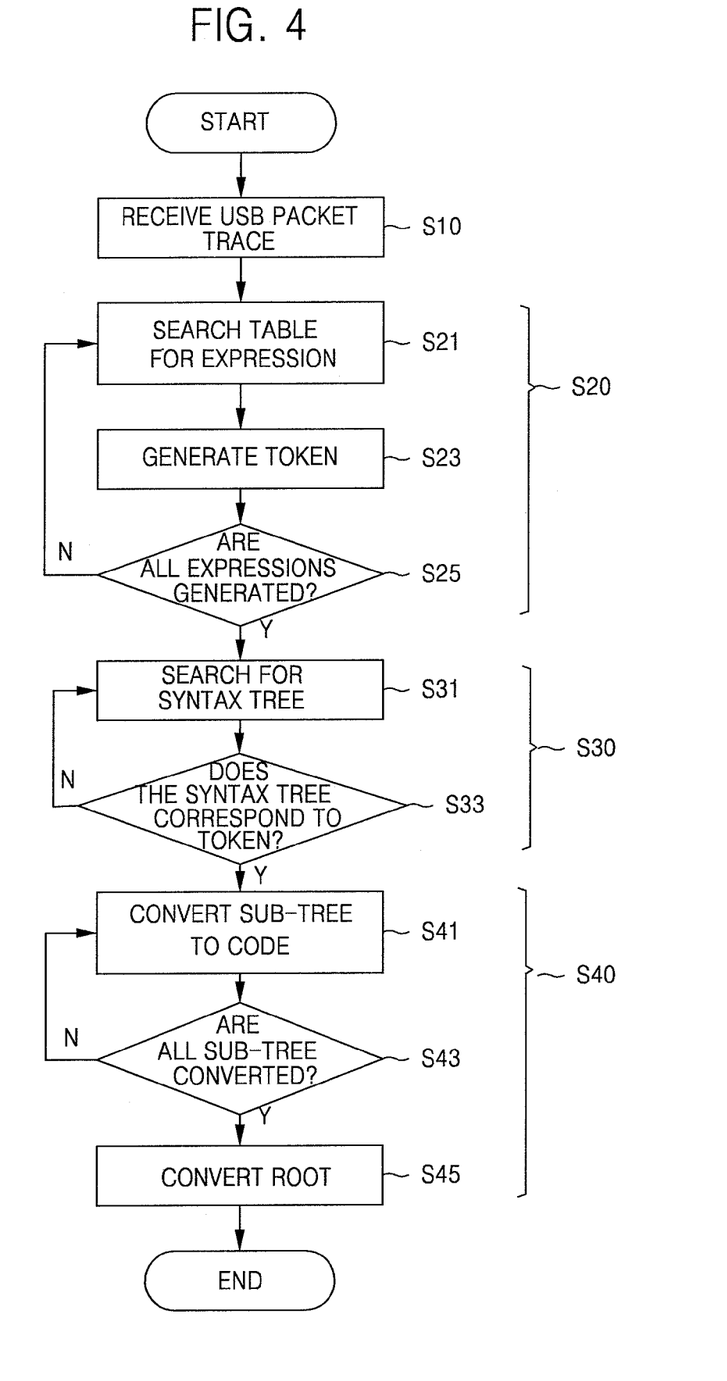
FIG. 4 is a flow chart for explaining a USB device test method according to an embodiment of the present invention.

FIG. 4 is a flow chart for explaining a USB device test method according to an embodiment of the present invention. Referring to FIGS. 1 and 4, the storage device 140 can be embodied by a hard disk drive, a magnetic disk drives, an optical disk drive, a Bernoulli cartridge, a random access memory (RAM), a read only memory (ROM), etc.

The token generation module 110 receives the USB packet trace output from the USB host 210 (S10) and generates at least one token corresponding to the received USB packet trace based on the expression-token table stored in the storage device 140 (S20). The token generation module 110 searches the expression-token table stored in the storage device 140 for an expression included in the received USB packet trace (S21) and generates the searched expression as at least one token from the token stored in the expression-token table corresponding to the expression (S23). The operations S21 and S23 for generating the expression as a token can be repeated until all the expressions included in the USB packet trace are generated as tokens corresponding thereto (S25).

The syntax tree determination module 120 determines the syntax tree corresponding to at least one token that is generated based on the syntax tree forest stored in the storage device 140 (S30). The syntax tree determination module 120 searches the syntax tree forest stored in the storage device 140 for the token that is generated (S31) and determines whether the searched syntax tree corresponds to the token (S33).

The host code generation module 130 generates a code for a USB host model corresponding to the determined syntax tree (S40). The host code generation module 130 converts a sub-tree of the determined syntax tree to a host model code (S41). When all sub-trees of the syntax tree are converted (S43), the host code generation module 130 converts a root of the syntax tree to the host model code (S45).

An operation of the USB packet trace converting apparatus 100 will be described in detail with reference to FIG. 5. FIG. 5 is a view showing the conversion process of a USB packet trace according to an exemplary embodiment of the present invention. Referring to FIGS. 1, 4, and 5, the token generation module 110 receives a packet trace of "pink addr=3 endp=2 idle=1" (S10). The token generation module 110 receives the packet trace from the USB packet logger 230.

The token generation module 110 searches the expression-token table for the first expression of "ping" of the packet trace (S21). The token generation module 110 generates the token of "PING" corresponding to the first expression of "ping" (S23). Also, the token generation module 110 determines whether all expressions are generated as tokens corresponding thereto (S25) and generates tokens until there is no expression that is not generated as a token. The generated token, the combination of the tokens corresponding to the received USB packet trace, is shown in (2) of FIG. 5.

The syntax tree determination module 120 determines the syntax tree based on the generated token (S30). The syntax tree forest shown in FIGS. 3A through 3S is searched for a syntax tree having the first token of "PING" as a node (S31). Since the syntax tree of FIG. 3I is the only syntax tree having the first token of "PING" as a node, the syntax tree of FIG. 3I is selected (S33).

Since the second sub-tree of the syntax tree of FIG. 3I is "addr_state", the syntax tree forest shown in FIGS. 3A through 3S are searched for a syntax tree corresponding to "addr_state" (S31). Since the syntax tree corresponding to "addr_state" is the syntax tree shown in FIG. 3O only, the syntax tree shown in FIG. 3O is selected (S33).

The next sub-tree is "endp_state" and the syntax tree forest shown in FIGS. 3A through 3S are searched for a syntax tree corresponding to "endp_state" (S31). Since the syntax tree corresponding to "endp_state" is the syntax tree shown in FIG. 3R only, the syntax tree shown in FIG. 3R is selected (S33).

The next sub-tree is "idel_state" and the syntax tree forest shown in FIGS. 3A through 3S are searched for a syntax tree corresponding to "idle_state" (S31). The syntax tree corresponding to "idle_state" exists in FIGS. 3P and 3Q only. When the terminal nodes "IDLE, EQ, and NUM" of FIG. 3P and "IDLE, EQ, and TO_EOF" of FIG. 3Q are searched, since the terminal nodes "IDLE, EQ, and TO_EOF" of FIG. 3Q do not match (2) of FIG. 5, the syntax tree shown in FIG. 3Q is not selected. The syntax tree determined in the above processes is shown in (3) of FIG. 5.

The host code generation module 130 generates a host model code based on the syntax tree shown in (3) of FIG. 5 (S40). The host code generation module 130 searches the sub-tree of the determined syntax tree and generates the host model code corresponding to the syntax tree.

The first sub-tree of the syntax tree shown in (3) of FIG. 5, that is, a sub-tree having "PING" as a root, is converted to a host model code (S41). Since the first sub-tree is a sub-tree having a token "PING" as a root, no code is generated.

Since all sub-trees are not converted to the host model code (S43), the host code generation module 130 converts the next sub-tree, that is, a sub-tree having "addr_state" as a root, to the host model code (S41). The conversion begins from a sub-tree of the sub-tree, that is, the sub-tree having "addr_state" as a root, to convert the sub-tree having "addr_state" as a root to the host model code (S41). Since all sub-trees include tokens of "ADDR", "EQ", and "NUM", no code is generated as a result of the conversion of all sub-trees to codes. When the root of the sub-tree, that is, the sub-tree having "addr_state" as a root, is converted to the host model code (S45), "USB_pkt.addr=atoi($3);" is generated.

The host code generation module 130 converts the next sub-tree, that is, a sub-tree having "endp_state" as a root, to the host model code (S41). The conversion begins from a sub-tree of the sub-tree, that is, the sub-tree having "endp_state" as a root, to convert the sub-tree having "endp_state" as a root to the host model code (S41). Since all sub-trees include tokens of "ENDP", "EQ", and "NUM", no code is generated as a result of the conversion of all sub-trees to codes. When the root of the sub-tree, that is, the sub-tree having "endp_state" as a root, is converted to the host model code (S45), "USB_pkt.endp=atoi($3);" is generated.

The host code generation module 130 converts the next sub-tree, that is, a sub-tree having "idle_state" as a root, to the host model code (S41). The process of converting the sub-tree, that is, sub-tree having "idle_state" as a root, to the host model code is similar to that of converting the above sub-trees, that is, the sub-tree having "addr_state" or "endp_state" as a root, to the host model code. No code is generated for the sub-tree having "idle_state" as a root (S45).

Since the code conversion of all sub-trees of the syntax tree, that is, the syntax tree having "out_ping_state" as a root, is complete (S43), when the root is converted to the host model code (S45), "USB_pkt.do(ping);" is generated. The host model code corresponding to the syntax tree shown in (3) of FIG. 5 is shown in (4) of FIG. 5.

The representation of the method for converting the above determined syntax tree to the host model code with yacc_notation (yet another compiler compiler_notation) is shown below. However, the following code is merely an exemplary embodiment of a case in which the host model code is a USB eVC (e Verification Components) code. However, the code can be embodied in other different methods according to the type and embodiment method of the host model code; the scope of the present invention is not limited thereto.

```
%{
#include <stdio.h>
int transfer_cnt = 1;
struct USB_packet {
    int addr;
    int endp;
    unsigned long data[1024];
    int len;
};
struct USB_packet USB_pkt;
```

-continued

```
        %}
        %token OUT ADDR ENDP PID EQ IN DATA SETUP PING IDLE
TO_EOF sdata LBRACE
        %token RBRACE FRAME AUTO
        %token EMPTY_FRAME EXPECTED_PID ACK NAK PRETRY BOOL
PNYET NYET
        %union
        {
                char string[10];
        }
        %token <string> NUM
        %%
        top_state:
                                statement
                                | top_state statement
                                ;
        statement:
                                PD EQ out_state
                                |PID EQ in_state
                                |PID EQ ack_state
                                |PID EQ setup_state
                                |PID EQ out_ping_state
                                |frame_state
                                |empty_frame_state
                                |expected_pid_state
                                ;
        setup_state:
                                SETUP addr_state endp_state ping_state idle_state PID
EQ data_state
                                ;
        ping_state:
                                PRETRY EQ BOOL PNYET EQ BOOL
                                ;
        ack_state:
                                ACK idle_state
                                ;
        frame_state:
                                FRAME EQ AUTO idle_state
                                ;
        empty_frame_state:
                                EMPTY_FRAME EQ NUM
                                ;
        expected_pid_state:
                                EXPECTED_PID EQ ACK idle_state
                                |EXPECTED_PID EQ NAK idle_state
                                |EXPECTED_PID EQ DATA idle_state
                                |EXPECTED_PID EQ NYET idle_state
                                ;
        out_state:
                                OUT addr_state endp_state idle_state PID EQ data_state
                                {
                                        int i;
                                        fprintf(stdout,"\t\twrite(p_host.get_pipe(%d,         %d,
OUT)", USB_pkt.addr, USB_pkt.endp);
                                        if(USB_pkt.len != 0)
                                        {
                                        fprintf(stdout,",{");
                                        for(i = 0: i < USB_pkt.len; i++)
                                        {
                                          fprintf(stdout, "%d", USB_pkt.data[i]);
                                          if( i != USB_pkt.len −1) fprintf(stdout,";");
                                        }
                                        fprintf(stdout,"); W n ");
                                        } else {
                                                fprintf(stdout, ",{});");
                                        }
                                        USB_pkt.len = 0;
                                        transfer_cnt++;
                                }
                                ;
        idle_state:
                                IDLE EQ NUM
                                | IDLE EQ TO_EOF
                                ;
        in_state:
                        IN addr_state endp_state idle_state
                                {
                                        fprintf(stdout,"\t\td                =
read(p_host.get_pipe(%d, %d,IN)); W n ", USB_pkt.addr, USB_pkt.endp);
```

-continued

```
            transfer_cnt++;
        }
        | IN addr_state endp_state
        {
            fprintf(stdout,"\t\td                            =
read(p_host.get_pipe(%d, %d,IN));W n ", USB_pkt.addr, USB_pkt.endp);
            transfer_cnt++;
        }
        ;
    out_ping_state:
        PING addr_state endp_state idle_state
        ;
    data_state:
        DATA ctx_state idle_state
        {
        }
        ;
    ctx_state:
        sdata EQ LBRACE num_series RBRACE
        | sdata EQ LBRACE RBRACE
        ;
    num_series:
        NUM {
            USB_pkt.data[USB_pkt.len++] = (unsigned long)strtol($1,
NULL, 16);
        }
        | num_series NUM
        {
            USB_pkt.data[USB_pkt.len++] = (unsigned long)strtol($2,
NULL, 16);
        }
        ;
    addr_state:
        ADDR EQ NUM {USB_pkt.addr = atoi($3);}
        ;
    endp_state:
        ENDP EQ NUM {USB_pkt.endp = atoi($3);}
        ;
```

Referring back to FIG. 1, the USB device test system 10 may further include the USB packet logger 230. The USB packet logger 230 connected between the USB host 210 and the USE device 220, receives the USB packet tracer output from the USB host 210, and outputs the received USB packet trace to the token generation module 110. The token generation module 110 receives through the USB packet logger 230, the USB packet trace output from the USB host 210 to the USB device 220. The USB packet logger 230, for example, a USB packet analyzer of Computer Access Technology Corporation (CATC), is connected between the USB host 210 and the USB device 220 and generates a file recording the packet trace that the USB host 210 outputs to the USE device 220. The file may be, for example, a utg file.

The host model 300 receives the host model code output from the host code generation module 130 and outputs a host signal corresponding to the received host model code. The host model 300 outputs the host signal to a USB device model (not shown). The USB device model receiving the host signal outputs a signal in response to the host signal. A user may check the signal output from the USB device model through a simulator to test the USB device.

The USB packet trace converting apparatus 100 converts the USB packet trace that the USB host 210 outputs to the USB device 220, to the host model code that can be used by the host model 300. The host model 300 outputs a host signal corresponding to the host model code to the USE device model. The USB device model outputs a signal in response to the host signal. Thus, the operation and generated signal of the USB device is tested using the same error situation as an actual situation.

The host model 300 may be a USB eVC (e Verification Components) and the USB device model can model an RTL level through Verilog, Synopses' VCS, or Mentor's Modelism.

The present invention can be embodied as computer readable codes on a computer readable recording medium. The computer readable recording medium may be any data storage device that can store data that can be read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Functional programs, codes, and code segments for implementing embodiments of the present invention can be understood by those of ordinary skill in the art to which the present invention pertains.

As described above, the method and system for testing a USB device according to an embodiment of the present invention reproduce an error of an actual situation and simulate the same internal signal and device status as those in an RTL/NET (netlist: gate level) simulation.

While this invention has been particularly shown and described with reference to preferred embodiments thereof, it will be understood by those skilled in the art that various changes in form and details may be made therein without departing from the spirit and scope of the disclosure.

What is claimed is:

1. A method for testing a USB (universal serial bus) device comprising:
   - receiving a USB packet trace output from a USB host, at a USB packet trace converting apparatus;
   - generating at least one token corresponding to the USB packet trace received from the USB host;
   - determining a syntax tree corresponding to the at least one token; and
   - generating a host code for a USB host model corresponding to the syntax tree.

2. The method of claim 1, wherein the receiving of the USB packet trace comprises;
   - receiving the USB packet trace output from the USB host through a USB packet logger; and
   - receiving the USB packet trace output from the USB packet logger at the USB packet trace converting apparatus.

3. The method of claim 2, wherein the USB packet logger generates a utg (USB traffic generation) file from the USB packet trace and outputs the utg file to the USB packet trace converting apparatus.

4. The method of claim 1 further comprising storing, in a predetermined storage device, an expression-token table, the expression-token table comprising a stored expression and a stored token corresponding to the expression, and a syntax tree forest generated based on the stored token.

5. The method of claim 4, wherein the generating of the at least one token comprises:
   - searching the stored expression of the expression-token table stored in the storage device for an expression included in the received USB packet trace; and
   - generating the at least one token from the stored token in the expression-token table corresponding to the stored expression based on the expression included in the received USB packet trace.

6. The method of claim 4, wherein the determining of the syntax tree comprises:
   - searching the syntax tree forest stored in the storage device for a syntax tree comprising the at least one token generated corresponding to the USB packet trace; and
   - determining whether the searched syntax tree is the syntax tree corresponding to the at least one token generated corresponding to the USB packet trace.

7. The method of claim 1, wherein the generating of the host code comprises generating the host code corresponding to the syntax tree while conducting a search from a sub-tree of the syntax tree.

8. The method of claim 1 wherein the host code for the USB host model is a USB eVC (e Verification Components) host code.

9. A computer readable medium storing instructions executable by a processor to perform a method for testing a USB (universal serial bus) device, the method steps comprising:
   - receiving a USB packet trace output from a USB host, at a USB packet trace converting apparatus;
   - generating at least one token corresponding to the USB packet trace received from the USB host;
   - determining a syntax tree corresponding to the at least one token; and
   - generating a host code for a USB host model corresponding to the syntax tree.

10. A system for testing a USB (universal serial bus) device, the system comprising:
    - a storage device storing an expression-token table, the expression-token table comprising an expression and a token corresponding to the expression, and a syntax tree forest generated based on the token of the expression-token table;
    - a token generation module receiving a USB packet trace output from a USB host and generating at least one generated token corresponding to the received USB packet trace based on the expression-token table;
    - a syntax tree determination module determining a syntax tree corresponding to the at least one generated token based on the syntax tree forest; and
    - a host code generation module generating a host code for a USB host model corresponding to the syntax tree.

11. The system of claim 10, wherein the token generation module receives the USB packet trace output from the USB host, through a USB packet logger.

12. The system of claim 11, further comprising a USB packet logger which is connected between the USB host and the USB device, receives the USB packet trace output from the USB host, and outputs the received USB packet trace to the token generation module.

13. The system of claim 10, wherein the token generation module searches the expression-token table stored in the storage device for a received expression included in the received USB packet trace and generates the at least one generated token with the token stored in the expression-token table corresponding to the expression based on the received expression.

14. The system of claim 10, wherein the syntax tree determination module searches the syntax tree forest stored in the storage device for a syntax tree comprising the at least one generated token and determines whether the searched syntax tree is the syntax tree corresponding to the at least one generated token.

15. The system of claim 10, wherein the host code generation module generates the host code corresponding to the syntax tree while conducting a search from a sub-tree of the syntax tree.

16. The system of claim 10, further comprising a host model which receives the host model code output from the host code generation module and outputs a host signal corresponding to the received host model code.

* * * * *